United States Patent [19]

Wright et al.

[11] 4,414,357

[45] Nov. 8, 1983

[54] POLYESTER OR ALKYD RESIN COMPOSITION CONTAINING ACRYLIC MICROGELS

[75] Inventors: Howard J. Wright, Kansas City, Mo.; David P. Leonard, Overland Park, Kans.; Roger A. Etzell, Farmington Hills, Mich.

[73] Assignee: Glasurit America, Inc., Detroit, Mich.

[21] Appl. No.: 297,631

[22] Filed: Aug. 31, 1981

Related U.S. Application Data

[63] Continuation-in-part of Ser. No. 98,115, Nov. 27, 1979, Pat. No. 4,290,932.

[51] Int. Cl.³ .................... C08L 67/02; C08L 67/08; C08L 33/14; C08L 33/02
[52] U.S. Cl. .................. 524/513; 525/167.5; 525/170
[58] Field of Search ............... 525/170, 167.5; 524/513

[56] References Cited

U.S. PATENT DOCUMENTS

| | | | |
|---|---|---|---|
| 3,880,796 | 4/1975 | Christenson et al. | 260/33.6 QA |
| 4,055,607 | 10/1977 | Sullivan et al. | 260/851 |
| 4,075,141 | 2/1978 | Porter et al. | 260/17.2 |

FOREIGN PATENT DOCUMENTS

| | | |
|---|---|---|
| 967051 | 8/1964 | United Kingdom . |
| 1538151 | 1/1979 | United Kingdom . |

*Primary Examiner*—Carman J. Seccuro
*Attorney, Agent, or Firm*—Wells & Wells

[57] ABSTRACT

A method of making a polyester or alkyd resin composition containing acrylic microgels comprises preparing an aqueous microgel emulsion of an acrylic resin which is crosslinked with a multifunctional crosslinking agent. The water from the emulsion can be removed by coagulation and/or azeotropic distillation with an organic solvent in which the microgel is insoluble and which forms an azeotrope with water. The resulting dehydrated microgel can be incorporated into a polyester or alkyd resin. Alternatively, the acrylic microgel emulsion can be incorporated into a water reducible alkyd resin.

10 Claims, No Drawings

POLYESTER OR ALKYD RESIN COMPOSITION CONTAINING ACRYLIC MICROGELS

This is a continuation-in-part of our application Ser. No. 98,115, filed Nov. 27, 1979, now U.S. Pat. No. 4,290,932, the disclosure of which is incorporated herein by reference.

The present invention is concerned with polyester and alkyd resin compositions, containing acrylic microgels, which are particularly useful as resinous, film-forming vehicles for high solids paints.

For present purposes, a "microgel" may be described as a stable dispersion of microparticles (usually 0.05–10 microns in size) composed of a polymer which is crosslinked to the extent that it is insoluble in an organic solvent in which the particles are dispersed.

Microgels of various types have been known for quite a long while but recently a great deal of work has gone into the preparation of such products because they appear to offer a way of obtaining high solids (low solvent) compositions for use in paints or coating compositions. Microgels are currently of particular interest in the industrial paint area where governmental regulations are requiring higher and higher solids coating systems.

As representative of the prior work on microgels, there may be mentioned U.S. Pat. Nos. 3,880,796, 4,025,474, 4,055,607 and 4,075,141; and British Pat. Nos. 967,051 and 1,538,151. Also of interest are articles by Funke "The Possible Uses of Reactive Microgels in Paint Formulation" JOCCA, 1977, 60, pages 438–445 and by Shashoua et al "Microgel: An Idealized Polymer Molecule", Journal of Polymer Science, Vol. XXXIII, pages 101–117 (1958).

An advantage in using microgels in paint systems is that they make it possible to obtain a higher solids content than would otherwise be possible without concurrently causing an increase in viscosity compared to systems without microgels.

It has been observed that acrylic microgels can give greatly improved sag resistance when used in high solids and water reducible polyesters and alkyd resins. It has also been observed that although the solution blend of the acrylic microgel and the polyester or alkyd resin is initially cloudy, the dried film resulting therefrom is clear and exhibits a high gloss.

While quite a variety of methods has previously been proposed to make microgels, the present invention is directed to a new method which is very convenient and advantageous while giving a microgel product that can be effectively used in high solids paint systems to provide coatings of excellent aluminum orientation and sag resistance.

One unique aspect of the invention is that the microgel is prepared by first making an aqueous emulsion of an acrylic resin which is crosslinked with a multifunctional ($\geq 2$) crosslinking agent and then dehydrating the system by azeotropically distilling off the water in the emulsion. The resulting very fine crosslinked resin particles can then be added to a conventional polyester or alkyd paint resin in organic solvent solution.

Alternatively, the acrylic microgel emulsion can be coagulated with an organic solvent. The water layer and organic layer may then be separated from each other. Some water may remain in the organic layer; it may be removed by adding sufficient solvent and azeotropically distilling the water.

Broadly described, therefore, the polyester or alkyd resin composition of the invention is made up of two essential components which, for ease of reference, may be called (1) the acrylic microgel component, and (2) the polyester or alkyd resin component. The combination of these components, within the variants mentioned herein, gives a resin composition of the present invention.

As noted, the acrylic microgel component, according to the invention, is prepared by aqueous polymerization of two or more ethylenically unsaturated monomers, one of which preferably includes an —OH or —COOH group and at least one of which is free from such groups, and a multifunctional crosslinking agent. Typically the monomer containing the —OH or —COOH group is acrylic acid, methacrylic acid, hydroxyethyl acrylate, hydroxypropyl acrylate, hydroxyethyl methacrylate or hydroxypropylmethacrylate. The ethylenically unsaturated monomers which are free from —OH and —COOH groups may be, for example, the alkyl esters of acrylic or methacrylic acid, particularly those having from 1 to 4 carbon atoms in the alkyl, e.g. methyl, ethyl, propyl or butyl acrylate; and methyl, ethyl, propyl or butyl methacrylate. Other suitable monomers include styrene or alpha-methyl styrene.

The crosslinking agent may be any such agent which contains at least two ethylenically unsaturated double bonds and will give a crosslinked polymer in aqueous emulsion polymerization that is insoluble in the organic solvent which is ultimately used to make up the acrylic resin compositions. As examples of suitable crosslinking agents there may be mentioned the following although it is noted that the invention is not limited thereto: ethylene glycol dimethacrylate, tetraethylene glycol dimethacrylate, methylene bisacrylamide, methylene bismethacrylamide, divinyl benzene, vinyl methacrylate, vinyl crotonate, vinyl acrylate, divinyl acetylene, trivinyl benzene, glycerine trimethacrylate, pentaerythritol tetramethacrylate, triallyl cyanurate, divinyl ethane, divinyl sulfide, divinyl sulfone, hexatriene, triethylene glycol dimethacrylate, diallyl cyanamide, glycol diacrylate, ethylene glycol divinyl ether, diallyl phthalate, divinyl dimethyl silane glycerol trivinyl ether, trimethylolpropane triacrylate, trimethylolethane triacrylate, trimethylolpropane trimethacrylate, trimethylolethane trimethacrylate, tetramethylene glycol dimethacrylate, triethylene glycol dimethacrylate, tetraethylene glycol diacrylate, tetraethylene glycol dimethacrylate, pentaerythritol diacrylate, pentaerythritol triacrylate, pentaerythritol tetraacrylate, dipentaerythritol diacrylate, dipentaerythritol triacrylate, dipentaerythritol tetraacrylate, dipentaerythritol pentaacrylate, dipentaerythritol hexacrylate, tripentaerythritol octoacrylate, pentaerythritol dimethacrylate, pentaerythritol trimethacrylate, dipentaerythritol dimethacrylate, dipentaerythritol tetramethacrylate tripentaerythritol octamethacrylate, pentaerythritol diitaconate, dipentaerythritol trisitaconate, dipentaerythritol pentaitaconate, dipentaerythritol hexaitaconate, 1,3-butanediol diacrylate, 1,3-butanediol dimethacrylate, 1,4-butanediol diitaconate, sorbitol triacrylate, sorbitol tetraacrylate, sorbitol tetramethacrylate, sorbitol pentaacrylate, sorbitol hexacrylate, modified 1,4-butylene diacrylate, 1,6 hexanediol diacrylate, modified trimethylolpropane triacrylate, modified pentaerythritol triacrylate, poly functional isocyanates with hydroxy monomers (isophorone diisocyanate plus hydroxy ethyl acrylate), methacrylated epoxy resin, and the like, and mixtures and prepolymers thereof.

The amount of ethylenically unsaturated monomers used to make up the acrylic microgel can be widely varied. Typical amounts will fall in the range of 10-90% by weight of monomer or monomers containing —OH or —COOH groups and 90-10% by weight of monomer or monomers which are free from such groups.

The amount of crosslinking agent that is used is important although this can be varied over a relatively large range. Desirably the amount of crosslinking agent constitutes at least about 0.5% and up to 20% by weight of the total amount of all materials used for the emulsion polymerization. In the normal situation this is roughly equivalent to a range of 5-70%, preferably 8-50%, by weight of the total weight of ethylenically unsaturated monomers and crosslinking agent.

Conventional emulsifiers or surfactants and initiators for emulsion polymerization are used to prepare the acrylic microgel emulsion. Typical emulsifiers (or surfactants) include such anionic alkali metal salts of organic carboxylic acids or soaps, e.g., potassium oleate or stearate. Alkyl sulfates and alkyl- or alkylarylsulfonates may also be used. Preferred for use are the sodium alkyl sulfosuccinates, e.g., disodium N-octadecyl sulfosuccinate and sodium diamyl sulfosuccinate, as well as sodium dihexyl sulfosuccinate, monoalkyd disodium sulfosuccinate. Advantageously, two or more such surfactants are used together since this seems to give an emulsion of better stability.

Suitable initiators are the free radical yielding peroxides and persalts, e.g., benzoyl peroxide, lauroyl peroxide, ammonium, potassium or sodium persulfate, etc.

Advantageously the acrylic microgel emulsion polymerization is carried out by adding the monomers gradually to heated water containing the emulsifier and initiator. Preferably the system is heated to, for example, 75°-90° C. during the monomer addition and for a short time afterwards although it will be appreciated that the polymerization conditions can be widely varied and will depend on other factors, e.g., the monomers involved. It is, in any case, important to obtain a stable acrylic microgel emulsion in which the polymer particles have sizes in the order of about 0.05 to 10 microns.

The aqueous acrylic microgel emulsion may be azeotropically distilled using any convenient organic solvent which forms an azeotrope with water but does not dissolve or swell the microgel solids. Typically suitable solvents include cellosolve acetate, butanol, naphtha, mineral spirits and the like. The amount of solvent used can be varied but should be enough to facilitate azeotropic removal of the water. All of the water of the microgel emulsion may be removed or only a portion thereof. Usually at least 50% by weight of the water should be removed.

An alternative is to coagulate the emulsion with an organic solvent. The coagulum can be physically separated from a water layer. The coagulated portion can then be dried further by azeotropic distillation or combined with the polyester or alkyd resin component.

The polyester resin employed in combination with the acrylic microgels to provide the composition of the present invention is the reaction product of at least one polyhydric alcohol and at least one polybasic acid.

Representative polyhydric alcohols include ethylene glycol, diethylene glycol, propylene glycol, glycerine, trimethylolethane, trimethylol propane, pentaerythritol, sorbitol, neopentylglycol, 2,2,4-trimethyl-1,3-pentanediol and hexane diol. Obviously, other conventionally employed polyhydric alcohols can also be employed.

Representative polybasic acid or anhydrides usefully employed to produce the polyester resin utilized in the compositions of the present invention include phthalic anhydride, phthalic acid, isophthalic acid, terephthalic acid, tetrahydrophthalic acid, hexahydrophthalic acid, maleic anhydride, maleic acid, fumaric acid, succinic anhydride, adipic acid and sebacic acid.

If desired a small amount of the polybasic acid or anhydride can be replaced by a monofunctional organic acid, such as benzoic acid to act as a chain stopper.

The polyester resin is prepared under conventional polyester polymerization conditions.

The alkyd resin employed in combination with the acrylic microgels to provide the composition of the present invention is the reaction product of at least one polyhydric alcohol, at least one polybasic acid and a fatty monobasic acid or oil.

Representative polyhydric alcohols usefully employed include those mentioned above for use in producing polyester resin. Also the polybasic acids mentioned above for use in producing polyesters can be employed to produce alkyd resins. Trimellitic anhydride can also be used.

Representative oils or fatty monobasic acids include soybean oil and tall oil fatty acids, the resulting alkyds being either medium oil or long oil alkyds.

As in the production of useful polyester resins, a monofunctional organic acid, such as benzoic acid can be employed in the preparation of the alkyd resin to act principally as a chain stopper.

The alkyd resin can be prepared by esterification procedures conventionally employed in their production.

The amount of microgel solids to polyester or alkyd resin solids in the final resin/microgel composition, will usually be in the range of 5 to 15% by weight of the total resin solids. Normally the total solids content of the final polyester or alkyd resin/microgel composition as used will be in the order of 40-60% by weight. The polyester or alkyd resin/microgel composition may be mixed with alkylated melamine-formaldehyde precondensates or polyesters and pigments, e.g., aluminum flake, to provide highly useful paints in coating compositions. As indicated, paints based on the present polyester or alkyd resin/microgel preparations with and without aluminum flake, on application and curing, are characterized by the orientation of the pigment and improved sag resistance.

The invention is illustrated by the following examples wherein parts, percentages and ratios are by weight unless otherwise indicated.

EXAMPLE I

A. Microgel Emulsion Preparation

| | |
|---|---|
| 51.775% | Deionized water |
| 0.600% | Aerosol MA-80 (American Cyanamid)* |
| 24.000% | Deionized water |
| 0.250% | Aerosol MA-80 |
| 0.600% | Surfactant 501 (American Cyanamid)** |
| 8.400% | Methyl methacrylate |
| 2.100% | Hydroxypropyl methacrylate |
| 10.500% | Hexanediol diacrylate |
| 1.525% | Deionized water |

| | |
|---|---|
| 0.250% | Ammonium persulfate |

*Sodium dihexyl sulfosuccinate
**Monoalkyl disodium sulfosuccinate

To a clean five liter, three neck, reaction flask, equipped with a thermometer, condenser and agitator are added the first charge of deionized water and the first charge of Aerosol MA-80. Under an inert gas blanket, this resulting mixture is warmed to 80° C.

A monomer premix of methyl methacrylate, hydroxy propyl methacrylate, hexanediol diacrylate, the second charge of deionized water, the second charge of Aerosol MA-80 and Surfactant 501 is prepared and added to a first addition funnel. This monomer premix is held under constant agitation to prevent separation.

A premix of the ammonium persulfate and third charge of deionized water is prepared and added to a second addition funnel.

The inert gas blanket in the reaction flask is then turned off and 10% of the ammonium persulfate solution in the second addition funnel is added to the reaction flask.

The monomer premix in the first addition funnel is then added to the reaction flask over three hours.

The remainder of the ammonium persulfate in the second addition funnel is then added to the reaction flask over 3½ hours. One half hour after the addition of this remainder portion of the ammonium persulfate catalyst solution, the contents of the reaction flask are cooled to 30° C. and are discharged from the flask.

The resulting product exhibited the following characteristics:

Nonvolatiles: 21±1%
Viscosity: 9–11 seconds #4 Ford Cup
Acid Number: 10 maximum
Color: White B. Microgel Dispersion Preparation The microgel emulsion prepared in Section A, above, was then converted to a microgel dispersion in an organic solvent or blend of solvents in the following manner using:

66.6 parts of the microgel emulsion from Section A
16.7 parts of n-butanol
16.7 parts of methyl amyl ketone The microgel emulsion from Section A is added to a five liter, three neck reaction flask equipped with a thermometer, an agitator and a Dean Stark water trap.

Under agitation the n-butanol is added to the microgel emulsion in the flask. Agitation is continued for ten minutes and then stopped. The n-butanol causes the acrylic microgel emulsion to coagulate and float to the surface. The bottom layer is removed from the reaction flask by suction.

The methyl amyl ketone is then added to the flask to further dilute the acrylic microgel dispersion. The resulting mixture is heated to reflux and the residual water is removed through the Dean-Stark water trap. When the contents of the reaction flask reach 105° C., the contents are cooled and filtered.

The resulting acrylic microgel dispersion exhibits the following characteristics:

Nonvolatiles: 35.1%
Acid Number: 8.5
Viscosity: 12 seconds #4 Ford Cup
Color: White C. Preparation of Polyester and Alkyd Resin Compositions Containing Acrylic Microgels 1. An acrylic microgel dispersion prepared in accordance with the procedures outlined in Section B, above, is added to a blend of (a) a melamine resin such a Cymel 303 (American Cyanamid)*** and (b) one of a high solids polyester, a high solids alkyd and a conventional alkyd resin. The acrylic microgel dispersion was added at a 5% and 15% level based on the total weight of the solids in the composition. The melamine resin was added at a 30% level based on the total weight of the solids in the composition.

***Hexamethoxymethylmelamine

2. An acrylic microgel emulsion prepared in accordance with Section A, above, is added to a water reducible alkyd previous neutralized with, for instance, ammonium hydroxide. The solids content of the resulting composition can then be adjusted to the desired level by the addition of water thereto. The acrylic microgel content of the compositions illustrated below is again 5% and 15% based on the total weight of the solids in the composition.

Representative polyester and alkyd resins employed to produce the resin compositions of the present invention in combination with an acrylic microgel emulsion or dispersion described above include the following:

Resin A—a high solids, oil-free polyester having the following composition: 44:4:24:28, neopentyl glycol:-trimethylol propane:adipic acid:isophthalic acid. This resin has a W-Y viscosity at 80% nonvolatiles in Cellosolve Acetate;

Resin B—a high solids, oil-free polyester having the following composition: 65:19:16, 2,2,4-trimethyl-1,3-pentanediol:isophthalic acid:terephthalic acid. This resin has a Z6 viscosity at 99±1% nonvolatiles;

Resin C—a high solids, oil-free polyester having the following composition: 49:38:13, 2,2,4-trimethyl-1,3-pentanediol:isophthalic acid:hexanediol. This resin has a Z6 viscosity at 99±1% nonvolatiles;

Resin D—a high solids, oil-free polyester having the following composition: 43:4:22:24:7, neopentyl glycol:-trimethylol propane:isophthalic acid:adipic acid:benzoic acid. This resin has a U-V viscosity at 80% nonvolatiles in Cellosolve Acetate;

Resin E—a high solids, oxidizing alkyd having the following composition: 36:32:37:5, soybean oil:trimethylol propane:phthalic anhydride:benzoic acid. This resin has a Z-1 viscosity at 85% nonvolatiles in Cellosolve Acetate;

Resin F—a conventional, oxidizing alkyd having the following composition: 41:21:39, soybean oil:-glycerine:phthalic anhydride. This resin has an X-Y viscosity at 60% nonvolatiles in xylene;

Resin G—a water reducible, oxidizing alkyd having the following composition: 36:26:5:25:8, tall oil fatty acid:trimethylol propane:benzoic acid:isophthalic acid:-trimellitic anhydride. This resin has a Z-Z2 viscosity at 70% nonvolatiles in a 1:1 mixture of n-butanol:Dowanol PM (Dow Chemical); and Resin H—a water reducible, oxidizing alkyd having the following composition: 38:7:21:25:3:6, tall oil fatty acid:neopentyl glycol:trimethylol propane:isophthalic acid:terephthalic acid:trimellitic anhydride. This resin has a Z6 viscosity at 75% nonvolatiles in a 55:45 mixture of n-butanol:Butyl Cellosolve.

The resins can be adjusted to the desired and workable viscosity by the addition thereto of an organic solvent such as methyl amyl ketone.

Films of the resin-acrylic microgel composition were cast on glass plates using a Leneta Anti-Sag draw down bar. Films of compositions containing Resins A-F were prepared using a 1-6 mil Leneta Anti-Sag bar; Resin G with a 14-60 mil bar and Resin H with a 3-12 mil bar. The different Leneta bars were used to illustrate more easily the differences in sag of the various resin-acrylic microgel compositions.

After the films were prepared, the glass panel was set to a verticle position and allowed to drain for five minutes. The panels were evaluated as to what film thickness the film sagged. Table I, below, records the test results.

TABLE I

|  | wt % Resin | wt % Cymel 303 | wt % Microgel 1 Dispersion | wt % Solids | Sag |
|---|---|---|---|---|---|
| Composition A | 70 | 30 | — | 77 | 2 |
| with Resin A | 65 | 30 | 5 | 77 | 3 |
|  | 55 | 30 | 15 | 77 | 4 |
| Composition B | 70 | 30 | — | 82 | 2 |
| with Resin B | 65 | 30 | 5 | 82 | 4 |
|  | 55 | 30 | 15 | 82 | 4 |
| Composition C | 70 | 30 | — | 77 | 2 |
| with Resin C | 65 | 30 | 5 | 77 | 3 |
|  | 55 | 30 | 15 | 77 | 5 |
| Composition D | 70 | 30 | — | 77 | 1 |
| with Resin D | 65 | 30 | 5 | 77 | 3 |
|  | 55 | 30 | 15 | 77 | 2 |
| Composition E | 70 | 30 | — | 77 | 1 |
| with Resin E | 65 | 30 | 5 | 77 | 2 |
|  | 55 | 30 | 15 | 77 | 2 |
| Composition F | 70 | 30 | — | 50 | 1 |
| with Resin F | 65 | 30 | 5 | 50 | 6 |
|  | 55 | 30 | 15 | 50 | 4 |
| Composition G | 100 | — | — | 50 | 14 |
| with Resin G | 95 | — | 5 | 50 | 20 |
|  | 85 | — | 15 | 50 | 40 |
| Composition H | 100 | — | — | 50 | 6 |
| with Resin H | 95 | — | 5 | 50 | 7 |
|  | 85 | — | 15 | 50 | 12 |

EXAMPLE 2

A. Microgel Emulsion Preparation

| | |
|---|---|
| 3.00% | Aerosol 18* (American Cyanamid) |
| 1.50% | Aerosol AY-65** (American Cyanamid) |
| 0.25% | Sodium bicarbonate |
| 40.25% | Deionized water (1st charge) |
| 0.25% | Ammonium persulfate |
| 14.75% | Deionized water (2nd charge) |
| 4.00% | Hydroxypropyl methacrylate |
| 32.00% | 2-Ethylhexyl acrylate |
| 4.00% | Divinyl benzene |

*Disodium n-octyldecyl sulfosuccinamate
**Sodium diamyl sulfosuccinamate

To a five liter, three neck reaction flask equipped with a condenser, thermometer and agitator, there are added the Aerosol 18, Aerosol AY-65, sodium bicarbonate and first charge of deionized water.

The ammonium persulfate and second charge of deionized water are premixed and added to a first small addition funnel.

The hydroxypropyl methacrylate, 2-ethylhexyl acrylate and divinyl benzene are premixed and added to a second, separate addition funnel.

The reaction flask contents, i.e. the surfactants, sodium bicarbonate and deionized water are heated to 87°±2° C. at which time 10% of the ammonium persulfate solution in the first addition funnel is added thereto.

The acrylic monomer premix in the second addition funnel is then added to the reaction flask continuously over 2½ hours. At the same time, the remaining ammonium persulfate solution in the first addition funnel is added continuously to the reaction flask over 3 hours.

The temperature of the reaction flask contents is held at 87±2° C. throughout the addition of the monomer pre-mix thereto.

Thirty minutes after the remaining ammonium persulfate solution is added to the reaction flask, the resulting emulsion is cooled to room temperature and discharged from the flask.

EXAMPLE 3

The monomer ratio of the microgel emulsion of Example 2 is 10/80/10, by weight, hydroxypropyl methacrylate/2-ethylhexyl acrylate/divinyl benzene. Using the same cooking procedures of the emulsion in Example 2, a microgel emulsion is prepared using a monomer ratio of 10/70/20, hydroxypropyl methacrylate/2-ethyl hexyl acrylate/divinyl benzene. The following components, in the amounts indicated are employed:

| | |
|---|---|
| 3.00% | Aerosol 18 |
| 1.50% | Aerosol AY-65 |
| 50.25% | Deionized water |
| 0.25% | Sodium bicarbonate |
| 0.25% | Ammonium persulfate |
| 14.75% | Deionized water |
| 3.00% | Hydroxypropyl methacrylate |
| 21.00% | 2-Ethylhexyl acrylate |
| 6.00% | Divinyl benzene |

EXAMPLE 4

Using the same surfantants, level and procedure for the microgel emulsion in Example 2, an emulsion is prepared with a 10/88/2 monomer ratio of hydroxypropyl methacrylate/methylmethacrylate, divinyl benzene.

EXAMPLES 5-11

Microgel emulsions I-IV were prepared with materials as shown in Table II. The procedure for the preparation of these emulsions is as follows:

To a five liter, three neck reaction flask, equipped with a condenser, thermometer and agitator, the first charge of deionized water and the first charge of Surfactant 501 are added.

A premix of the ammonium persulfate and second charge of deionized water is prepared and introduced into a first, small addition funnel.

A premix of styrene, butyl methacrylate, 2-ethylhexyl acrylate, hydroxypropyl methacrylate, acrylic acid, trimethylol propane triacrylate, COPS I, the second charge of 501 and the third charge of deionized water is prepared and introduced into a second addition funnel. This premix of monomers, deionized water and surfactant, termed a pre-emulsion, was held under constant agitation to maintain a uniform mixture.

The contents of the reaction flask, i.e. the first charge of deionized water and first charge of Surfactant 501 were heated to 72±2° C. at which point 17% of the ammonium persulfate solution in the first addition funnel was added thereto.

The monomer pre-emulsion in the second addition funnel was then added to the reaction flask continuously over 2½ hours.

The remainder of the ammonium persulfate solution in the furst addition funnel was added to the reaction flask over 2¾ hours. One half hour after the last addition was made, the emulsion was cooled to 30° C. and discharged from the flask.

Microgel emulsions V–VII were prepared according to the procedure in Example 2.

TABLE II

| Emulsions | Ex 5 I | Ex 6 II | Ex 7 III | Ex 8 IV | Ex 9 V | Ex 10 VI | Ex 11 VII |
|---|---|---|---|---|---|---|---|
| Aerosol 18 | | | | | 3.00 | 3.00 | 3.00 |
| Aerosol AY-65 | | | | | 1.50 | 1.50 | 1.50 |
| Sodium Bicarbonate | | | | | .25 | .25 | .25 |
| Surfactant 501* (1st charge) | 1.25 | 1.25 | 1.25 | 1.25 | | | |
| Deionized Water (1st charge) | 15.75 | 15.75 | 15.75 | 15.75 | 39.75 | 39.75 | 57.75 |
| Ammonium Persulfate | .25 | .25 | .25 | .25 | .25 | .25 | .25 |
| Deionized Water (2nd charge) | 7.25 | 7.25 | 7.25 | 7.25 | 7.25 | 7.25 | 7.25 |
| Styrene | 12.95 | 12.85 | 12.7 | 12.475 | 11.975 | 11.55 | 6.60 |
| Butyl Methacrylate | 12.025 | 11.875 | 11.75 | 11.525 | 11.050 | 10.55 | 6.00 |
| 2-Ethylhexyl Acrylate | 10.075 | 9.95 | 9.85 | 9.60 | 9.125 | 8.65 | 4.80 |
| Hydroxypropyl Methacrylate | 12.00 | 11.875 | 11.75 | 11.525 | 11.050 | 10.55 | 6.00 |
| Acrylic Acid | .95 | .975 | .975 | .95 | .95 | .95 | .60 |
| Trimethylolpropane Triacrylate | | .475 | .975 | 1.925 | 3.85 | 5.75 | 6.00 |
| Surfactant 501 (2nd charge) | 1.25 | 1.25 | 1.25 | 1.25 | | | |
| COPS I** | 1.25 | 1.25 | 1.25 | 1.25 | | | |
| Deionized Water (3rd charge) | 25.00 | 25.00 | 25.00 | 25.00 | | | |
| TOTAL | 100.00 | 100.00 | 100.00 | 100.00 | 100.00 | 100.00 | 100.00 |

*Monoalkyldisodium Sulfosuccinate (American Cyanamid)
**COPS I Proprietary Copolymerizable Surfactants (Alcolac)

EXAMPLES 12–13

The following two microgel emulsions were prepared employing the procedure as shown in Example 2.

|  | Example 12 | Example 13 |
|---|---|---|
| Surfactant 501 | 2.450% | 2.500% |
| COPS I | 1.250% | 1.250% |
| Deionized Water | 45.975% | 42.825% |
| Ammonium Persulfate | .175% | .175% |
| Deionized Water | 7.249% | 7.225% |
| Methyl Methacrylate | 13.300% | 14.250% |
| Ethyl Acrylate | 24.453% | 26.225% |
| Acrylic Acid | 1.715% | 1.850% |
| Pentaerythritol Triacrylate | 3.433% | — |
| Diethylene Glycol Diacrylate | — | 3.700% |

EXAMPLES 14–23

Microgel emulsions VIII–XVII were prepared with materials as shown in Table III. Emulsions VIII, X and XVI were prepared according to the procedure used for emulsion I-IV of examples 5–8. Emulsions IX, XI–XIII and XVII were prepared in a manner similar to Example 2. Emulsion XIV was prepared like Example 2 with the following changes. The premix of water and ammonium persulfate was added over four hours. The premix of methyl methacrylate, 29% of the hydroxyethyl acrylate and hexanediol diacrylate was added over 2 hours. The reaction was held at 80±2° C. for ½ hour, then a second premix of the styrene, butyl methacrylate, 2-ethylhexyl acrylate, 71% of the hydroxyethyl acrylate and the acrylic acid was added over 1½ hours.

TABLE III

| Example Emulsion | 14 VIII | 15 IX | 16 X | 17 XI | 18 XII | 19 XIII | 20 XIV | 21 XV | 22 XVI | 23 XVII |
|---|---|---|---|---|---|---|---|---|---|---|
| Surfactant 501 | | 2.50 | | 2.50 | 2.50 | | 2.50 | 2.50 | 1.25 | 2.50 |
| COPS I | | 1.25 | | 1.25 | 12.5 | | 1.25 | 1.25 | | 1.25 |
| Aerosol MA-80* | .275 | | .275 | | | | | | | |
| Aerosol 18 | | | | | | 3.00 | | | | |
| Aerosol AY-65 | | | | | | 1.500 | | | | |
| Deionized Water | 52.15 | 68.75 | 52.15 | 68.75 | 68.75 | 67.75 | 68.75 | 48.75 | 43.75 | 68.75 |
| Ammonium Persulfate | | | | | | 0.25 | | | | |
| Ammonium Persulfate | 0.025 | 0.25 | 0.025 | 0.25 | 0.25 | 0.25 | 0.25 | 0.25 | 0.25 | 0.25 |
| Deionized Water | 0.475 | 7.25 | 0.475 | 7.25 | 7.25 | 7.25 | 7.25 | 7.25 | 7.25 | 7.25 |
| Surfactant 501 | | | | | | | | | 1.25 | |
| COPS I | | | | | | | | | 1.25 | |
| Aerosol 22** | .60 | | .60 | | | | | | | |
| Aerosol MA-80* | .25 | | .25 | | | | | | | |
| Deionized Water | 25.00 | | 25.00 | | | | | | 25.00 | |
| Hexanediol Diacrylate | 10.50 | 10.00 | 10.50 | 10.00 | 10.00 | 10.00 | 10.00 | 10.00 | 10.00 | 10.00 |
| Methyl Methacrylate | | 8.00 | | | | | | | 8.00 | |
| Hydroxypropyl | | | | | | | | | | 2.00 |

TABLE III-continued

| Example | 14 | 15 | 16 | 17 | 18 | 19 | 20 | 21 | 22 | 23 |
|---|---|---|---|---|---|---|---|---|---|---|
| Emulsion | VIII | IX | X | XI | XII | XIII | XIV | XV | XVI | XVII |
| Methacrylate | | | | | | | | | | |
| Butyl Acrylate | | | | | | | | | 8.00 | |
| Ethylhexyl Acrylate | 8.40 | | | | | | | 4.20 | | |
| Hydroxyethyl Acrylate | 2.10 | 2.00 | 2.10 | 2.00 | 2.00 | 2.00 | 2.00 | 7.00 | | 2.00 |
| Butyl Methacrylate | | | 8.40 | | | | | 5.00 | | |
| Styrene | | | | | | 8.00 | | 5.40 | | |
| Ethyl Acrylate | | | | | | | | | | 8.00 |
| Acrylic Acid | | | | | | | | 0.40 | | |
| Methyl Acrylate | | | | | | | 8.00 | | | |
| Isobutyl Acrylate | | | | | 8.00 | | | | | |
| Isobutyl Methacrylate | | | | 8.00 | | | | | | |
| Ammonium Persulfate | .225 | | .225 | | | | | | | |
| | 100.00 | 100.00 | 100.00 | 100.00 | 100.00 | 100.00 | 100.00 | 100.00 | 100.00 | 100.00 |

*Sodium dihexyl sulfosuccinate (American Cyanamid)
**Tetrasodium N—(1,2-dicarboxy-ethyl)-N—octadecyl sulfosuccinate (American Cyanamid)

EXAMPLE 24

Microgel Emulsion Preparation

| | |
|---|---|
| .275% | Aerosol MA-80 |
| 52.150 | Deionized Water |
| .250% | Ammonium persulfate |
| 4.475 | Deionized Water |
| 8.400% | Methyl methacrylate |
| 2.100% | Hydroxypropyl methacrylate |
| 10.000% | 1,6-Hexanediol diacrylate |
| .250% | Aerosol MA-80 |
| .600% | Aerosol 22 |
| 21.500% | Deionized Water |

Procedure:

To a five liter, three neck reaction flask equipped with a condenser, thermometer and agitator, the first charge of Aerosol MA-80 and the first charge of deionized water are added.

A premix of the ammonium persulfate and second charge of deionized water is prepared and introduced into a first small addition funnel.

A premix of methyl methacrylate, hydroxypropyl methacrylate, 1,6-hexanediol diacrylate, the second charge of Aerosol MA-80, Aerosol 22, and the third charge of deionized water is prepared and introduced into a second addition funnel. This monomer pre-emulsion is held under constant agitation to maintain a uniform mixture.

The contents of the reaction flask, i.e. the first charge of Aerosol MA-80 and first charge of deionized water are heated to 80±2° C. at which time 10% of the ammonium persulfate solution is added to the reaction flask.

The monomer pre-emulsion and 80% of the ammonium persulfate solution are added simultaneously and continuously over 2½ hours to the reaction flask.

The remaining 10% of the ammonium persulfate solution is then added to the reaction flask over the next 20 minutes. The emulsion is held ½ hour, cooled, and discharged from the flask.

The acrylic microgel emulsions of Examples 2-24 can be employed to produce microgel dispersions in accordance with the procedures set forth in Example 1B.

Moreover, the acrylic microgel emulsions of Examples 2-4 and 9-24 or the dispersions made therefrom, as noted above, can be used to prepare polyester and alkyd resin compositions in accordance with the procedures set forth in Example 1C.

It will be appreciated that various modifications may be made in the invention as described above. Accordingly, the scope of the invention is defined in the following claims wherein:

What is claimed is:

1. A method of making a polyester or alkyd resin composition containing an acrylic microgel for use in paint systems to provide coatings of improved sag resistance which comprises preparing an aqueous, microgel emulsion by the emulsion polymerization in water of a mixture of ethylenically unsaturated monomers, at least one of said monomers being an acrylic or methacrylic acid, or an —OH substituted alkyl ester thereof, and containing a —COOH or —OH group, and at least another of said monomers being selected from an alkyl ester of an acrylic or methacrylic acid, styrene and α-methyl styrene and being free from —COOH and —OH groups, and a multifunctional crosslinking agent present in an amount of 5-70 percent by weight of the total weight of said ethylenically unsaturated monomers and crosslinking agent, removing water from the emulsion by coagulation and/or azeotropic distillation with an organic solvent in which the microgel is insoluble and which forms an azeotrope with water, and incorporating the microgel into a polyester or alkyd resin to provide said polyester or alkyd microgel resin composition wherein the amount of microgel solids is in the range of 5 to 15 percent by weight of the total resin solids.

2. The method of claim 1 wherein said ethylenically unsaturated monomer containing a —COOH or —OH group used to prepare said aqueous microgel emulsion is selected from acrylic acid, methacrylic acid, hydroxyethyl acrylate, hydroxypropyl acrylate, hydroxyethyl methacrylate and hydroxypropyl methacrylate.

3. The method of claim 1 wherein the amount of ethylenically unsaturated monomer containing said —OH or —COOH groups used in the preparation of said microgel ranges from 10 to 90 weight percent and the amount of said ethylenically unsaturated monomer free from said —OH or —COOH groups ranges from 90 to 10 weight percent.

4. The polyester or alkyd resin composition of claim 1.

5. A paint containing the resin composition of claim 4.

6. A method of making an alkyd resin composition containing an acrylic microgel for use in paint systems to provide coatings of improved sag resistance which comprises preparing an aqueous microgel emulsion by the emulsion polymerization in water of a mixture of ethylenically unsaturated monomers, at least one of said monomers being an acrylic or methacrylic acid, or an —OH substituted alkyl ester thereof, and containing a —COOH or —OH group, and at least another of said monomers being selected from an alkyl ester of an acrylic or methacrylic acid, styrene and α-methyl styrene, and being free from —COOH and —OH groups, and a multifunctional crosslinking agent present in an amount of 5–70 percent by weight of the total weight of said ethylenically unsaturated monomers and crosslinking agent and incorporating the resulting acrylic microgel emulsion into a water reducible alkyd resin to provide said alkyd resin composition wherein the amount of microgel solids is in the range of 5 to 15 percent by weight of the total resin solids.

7. The method of claim 6 wherein said ethylenically unsaturated monomer containing a —COOH or —OH group used to prepare said aqueous microgel emulsion is selected from acrylic acid, methacrylic acid, hydroxyethyl acrylate, hydroxypropyl acrylate, hydroxyethyl methacrylate and hydroxypropyl methacrylate.

8. The method of claim 6 wherein the amount of ethylenically unsaturated monomer containing said —OH or —COOH groups used in the preparation of said microgel ranges from 10 to 90 weight percent and the amount of said ethylenically unsaturated monomer free from said —OH or —COOH groups ranges from 90 to 10 weight percent.

9. The alkyd resin composition of claim 6.

10. A paint containing the alkyd resin composition of claim 9.

* * * * *